(12) United States Patent
Miyashita et al.

(10) Patent No.: US 7,250,985 B2
(45) Date of Patent: Jul. 31, 2007

(54) COLOR DEMODULATION CIRCUIT

(75) Inventors: Kazuya Miyashita, Moriguchi (JP); Toshihiro Matsumura, Yasu-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 524 days.

(21) Appl. No.: 10/942,897

(22) Filed: Sep. 17, 2004

(65) Prior Publication Data
US 2005/0057692 A1    Mar. 17, 2005

(30) Foreign Application Priority Data
Sep. 17, 2003    (JP) .............................. 2003-324996

(51) Int. Cl.
H04N 9/70    (2006.01)

(52) U.S. Cl. ...................... 348/638; 348/644

(58) Field of Classification Search ........ 348/643–647, 348/638–641, 649–654
See application file for complete search history.

(56) References Cited

U.S. PATENT DOCUMENTS

| | | | |
|---|---|---|---|
| 3,564,124 A * | 2/1971 | Popovich ..................... | 348/644 |
| 3,639,683 A * | 2/1972 | Sutherland .................. | 348/643 |
| 4,344,084 A | 8/1982 | Engel et al. | |
| 4,477,831 A * | 10/1984 | Hosoya ....................... | 348/647 |
| 4,661,841 A * | 4/1987 | Suzuki ........................ | 348/646 |
| 4,847,679 A * | 7/1989 | Ohtsuki ...................... | 348/646 |
| 5,982,975 A | 11/1999 | Kim | |

FOREIGN PATENT DOCUMENTS

| | | |
|---|---|---|
| JP | 6-327028 | 11/1994 |
| JP | 7-20251 | 3/1995 |
| JP | 8-107549 | 4/1996 |

* cited by examiner

Primary Examiner—Michael H. Lee
(74) Attorney, Agent, or Firm—Wenderoth, Lind & Ponack, L.L.P.

(57) ABSTRACT

A color demodulation circuit that can complement an unstable state of an output from an ACC circuit and can obtain stable color-difference outputs, regardless of a burst signal in a chrominance carrier signal. Normally, a selector connects an output from a first multiplier that controls an amplitude of an output from a band-pass filter using an output from the ACC circuit, to a color-difference output demodulation circuit. However, during a period in which there are abrupt changes in the burst signal, for example during a period in which the output from the ACC circuit becomes unstable such as at switching between a state including a burst and a state not including a burst, the selector connects an output from a second multiplier that controls the amplitude of the output from the band-pass filter using an ACC output monitor signal, to the color-difference demodulation circuit.

4 Claims, 6 Drawing Sheets

COLOR DEMODULATION CIRCUIT

FIELD OF THE INVENTION

The present invention relates to ACC (automatic chroma control) circuits in color demodulation circuits for performing television signal processing, and chroma killer control.

BACKGROUND OF THE INVENTION

A conventional color demodulation circuit includes a circuit that detects a burst portion in a digital chrominance carrier signal of a television signal to perform an automatic control for making an amplitude of the detected burst portion have a preset color signal amplitude level (hereinafter, this circuit will be referred to as an ACC circuit, for example a circuit as described in Japanese Published Patent Application No. Hei. 08-107549), and a circuit that detects a phase shift or an amplitude level of a burst signal that has been outputted from the ACC circuit, thereby performing chroma killer. A structure of such color demodulation circuit is schematically shown in FIG. 6.

The color demodulation circuit shown in FIG. 6 includes a band-pass filter 1, an ACC circuit 2, a multiplier 3, a phase killer detection circuit 4, an amplitude killer detection circuit 5, a chroma killer control circuit 6, and a color-difference output demodulation circuit 7.

The band-pass filter 1 extracts color components from a digital chrominance carrier signal.

The ACC circuit 2 performs an automatic control for making a signal amplitude of a burst portion in the chrominance carrier signal be at a level that is set by a color level setting signal.

The multiplier 3 multiplies an output from the band-pass filter 1 by an output from the ACC circuit 2.

The phase killer detection circuit 4 outputs a phase killer detection signal from an output of the multiplier 3 on the basis of a phase shift of the amplitude-controlled burst portion in the chrominance carrier signal.

The amplitude killer detection circuit 5 outputs an amplitude killer detection signal from an output of the ACC circuit 2 on the basis of an amplitude level of the amplitude-controlled burst portion in the chrominance carrier signal.

The chroma killer control circuit 6 outputs a chroma killer signal on the basis of the phase killer detection signal that is outputted from the phase killer detection circuit 4, and the amplitude killer detection signal that is outputted from the amplitude killer detection circuit 5.

The color-difference output demodulation circuit 7 demodulates color-difference signals (an R-Y signal and a B-Y signal) from the output of the multiplier 3 on the basis of the chroma killer signal.

Next, the operation of the conventional color demodulation circuit will be described.

The band-pass filter 1 extracts color components from an inputted chrominance carrier signal, to be multiplied by the output from the ACC circuit 2, using the multiplier 3. The ACC circuit 2 outputs a value that is adapted to the amplitude of the output from the band-pass filter 1 so as to always keep a color signal amplitude (color level) that has been previously set by the color level setting signal, while the output from the multiplier 3 is being fed back. That is, with the ACC circuit 2 and the multiplier 3, the chrominance carrier signal that is always amplitude controlled adaptively to a color level that is set by the color level setting signal is outputted to the phase killer detection circuit 4 and the color-difference output demodulation circuit 7.

The phase killer detection circuit 4 detects a phase state of the amplitude-controlled burst portion in the chrominance carrier signal, from the output of the multiplier 3, and outputs a phase killer detection signal when the burst phase is not kept at a prescribed phase state. Further, the amplitude killer detection circuit 5 detects an amplitude of the amplitude-controlled burst portion in the chrominance carrier signal, from the output of the ACC circuit 2, and outputs an amplitude killer detection signal when the burst amplitude does not reach a prescribed level.

The chroma killer control circuit 6 outputs a chroma killer signal to the color-difference output demodulation circuit 7 on the basis of the phase killer detection signal that is outputted from the phase killer detection circuit 4 and the amplitude killer detection signal that is outputted from the amplitude killer detection circuit 5.

The color-difference output demodulation circuit 7 detects a burst signal state of the inputted chrominance carrier signal on the basis of the chroma killer signal that is outputted from the chroma killer control circuit 6, and demodulates an R-Y signal and a B-Y signal from the output of the multiplier 3 on the basis of the burst signal state.

However, when instantaneous changes occur in the burst signal that is inputted to the conventional ACC circuit 2, for example when a chrominance carrier signal in which a state including a burst signal and a state without a burst signal temporally switch, as shown in FIG. 3(a), is inputted to the color demodulation circuit, it takes time to stabilize the result of an operation in the ACC circuit 2 for deciding a factor of the multiplier 3 on the basis of the state of the signal amplitude of the burst portion of the inputted chrominance carrier signal and the state of the output from the multiplier 3. Therefore, the state of the output from the ACC circuit 2 becomes unstable at a changing point between the state including a burst signal/the state without a burst signal, or in the state without a burst signal.

Further, when the chrominance carrier signal in the state where a burst signal is not included is inputted to the color demodulation circuit, the state of an output from the ACC circuit 2 becomes unstable because the operation of the ACC circuit 2 for automatically controlling the burst signal amplitude level to a preset color signal amplitude cannot be performed. Therefore, when the state of the output from the ACC circuit 2 is unstable, the R-Y signal and the B-Y signal that are outputted from the color-difference output demodulation circuit 7 are also recognized as noises on a television screen, due to abrupt variations. Further, as the output from the ACC circuit 2 is directly coupled also to the amplitude killer detection circuit 5, an erroneous detection of an amplitude killer may occur.

Further, in the conventional color demodulation circuit, the ACC circuit 2 always outputs the chrominance carrier signal of a fixed amplitude level, independently of the input amplitude level. However, when a miniscule input in such a case where the strength of the electric field of the chrominance carrier signal is weak is given to the multiplier 3, the output of the ACC circuit 2 is adversely increased by an automatic color control capability of the ACC circuit 2, and when a further miniscule input is given to the multiplier 3, the output of the ACC circuit 2 becomes saturated. As a result, the state of the output from the ACC circuit 2 becomes unstable, and the chrominance color signal cannot be kept at a fixed amplitude level. Further, when the input to the multiplier 3 becomes too small, the amplitude level is attenuated. When the phase killer detection is performed in this state by the conventional structure that performs the phase killer detection on the basis of the burst amplitude, a phase killer would be detected while the phase is proper, i.e., there occurs an erroneous detection of the phase killer.

As described above, the conventional color demodulation circuit cannot address temporal changes in the burst signal or changes in the electric field state of the chrominance color signal, whereby it is difficult to perform a stable killer detection and color-difference output.

SUMMARY OF THE INVENTION

The present invention has for its object to provide a color demodulation circuit that can perform a stable color-difference demodulation, independently of the state of an output from the ACC circuit.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a color demodulation circuit that demodulates color-difference signals from a chrominance carrier signal, including: a first amplifier circuit for amplifying an amplitude of the chrominance carrier signal; an ACC circuit for variably controlling a degree of amplification of the first amplifier circuit in accordance with the inputted chrominance carrier signal; a chroma killer generation circuit for detecting an amplitude level of a burst portion in the chrominance carrier signal from an output of the ACC circuit as well as detecting a phase shift of the burst portion in the chrominance carrier signal from an output of the first amplifier circuit, and generating a chroma killer signal on the basis of detection results; a second amplifier circuit for amplifying an amplitude of the chrominance carrier signal; a selector for selecting one of an output from the first amplifier circuit and an output from the second amplifier circuit; a control circuit for setting a degree of amplification of the second amplifier circuit and switching the selector on the basis of the chroma killer signal; and a color-difference output demodulation circuit for demodulating color-difference signals from the output of the selector. Therefore, it is possible to select a chrominance carrier signal that has been amplitude-controlled by an amplifier circuit that is dependent on the output from the ACC circuit or a chrominance carrier signal that has been amplitude-controlled by an amplifier circuit that is independent on the output from the ACC circuit while detecting abrupt changes in the burst signal, whereby it is possible to avoid transient noises on a television screen which would occur when the state of the output of the ACC circuit is not stable, and erroneous detection of an amplitude killer.

According to a 2nd aspect of the present invention, in the color demodulation circuit of the 1st aspect, the control circuit switches the selector to select an output from the first amplifier circuit when the chroma killer signal is OFF, while selecting an output from the second amplifier circuit when the chroma killer signal is ON. Therefore, it is possible to demodulate color-difference outputs from a chrominance carrier signal that has been amplitude-controlled by an amplifier circuit that is independent on an output from the ACC circuit when the chroma killer signal is ON, thereby obtaining more stable color-difference outputs.

According to a 3rd aspect of the present invention, there is provided a color demodulation circuit that demodulate color-difference signals from a chrominance carrier signal including: a first amplifier circuit for amplifying an amplitude of the chrominance carrier signal; an ACC circuit for variably controlling a degree of amplification of the first amplifier circuit in accordance with the inputted chrominance carrier signal; a second amplifier circuit for amplifying an amplitude of the chrominance carrier signal; a control circuit for setting a degree of amplification of the second amplifier circuit on the basis of an electric field strength of the chrominance carrier signal; a selector for selecting one of an output from the first amplifier circuit and an output from the second amplifier circuit on the basis of the electric field strength of the chrominance carrier signal; a chroma killer generation circuit for detecting an amplitude level of a burst portion in the chrominance carrier signal from an output of the ACC circuit as well as detecting a phase shift of the burst portion in the chrominance carrier signal from an output of the selector, and generating a chroma killer signal on the basis of detection results; and a color-difference demodulation circuit for demodulating color-difference signals from the output of the first amplifier circuit. Therefore, it is possible to change an output from-the amplifier, which is inputted to the phase killer detection circuit, while detecting an electric field strength of an inputted chrominance carrier signal, whereby it is possible to perform phase killer detection according to the electric field strength, and prevent erroneous detection of a phase killer.

According to a 4th aspect of the present invention, in the color demodulation circuit of the 3rd aspect, the selector selects an output from the first amplifier circuit when the chrominance carrier signal is higher than a previously set electric field strength, while selecting an output from the second amplifier circuit when the chrominance carrier signal is lower than the previously set electric field strength. Therefore, it is possible to input a chrominance carrier signal that has been amplitude-controlled by an amplifier circuit which is independent of an output from the ACC circuit, to the phase killer detection circuit when the electric field strength of the inputted chrominance carrier signal is weak, thereby preventing erroneous detection of a phase killer.

DETAILED DESCRIPTION OF THE PREFERRED EMBODIMENTS

Hereinafter, embodiments of the present invention will be described with reference to the drawings.

Embodiment 1

Figure 1:
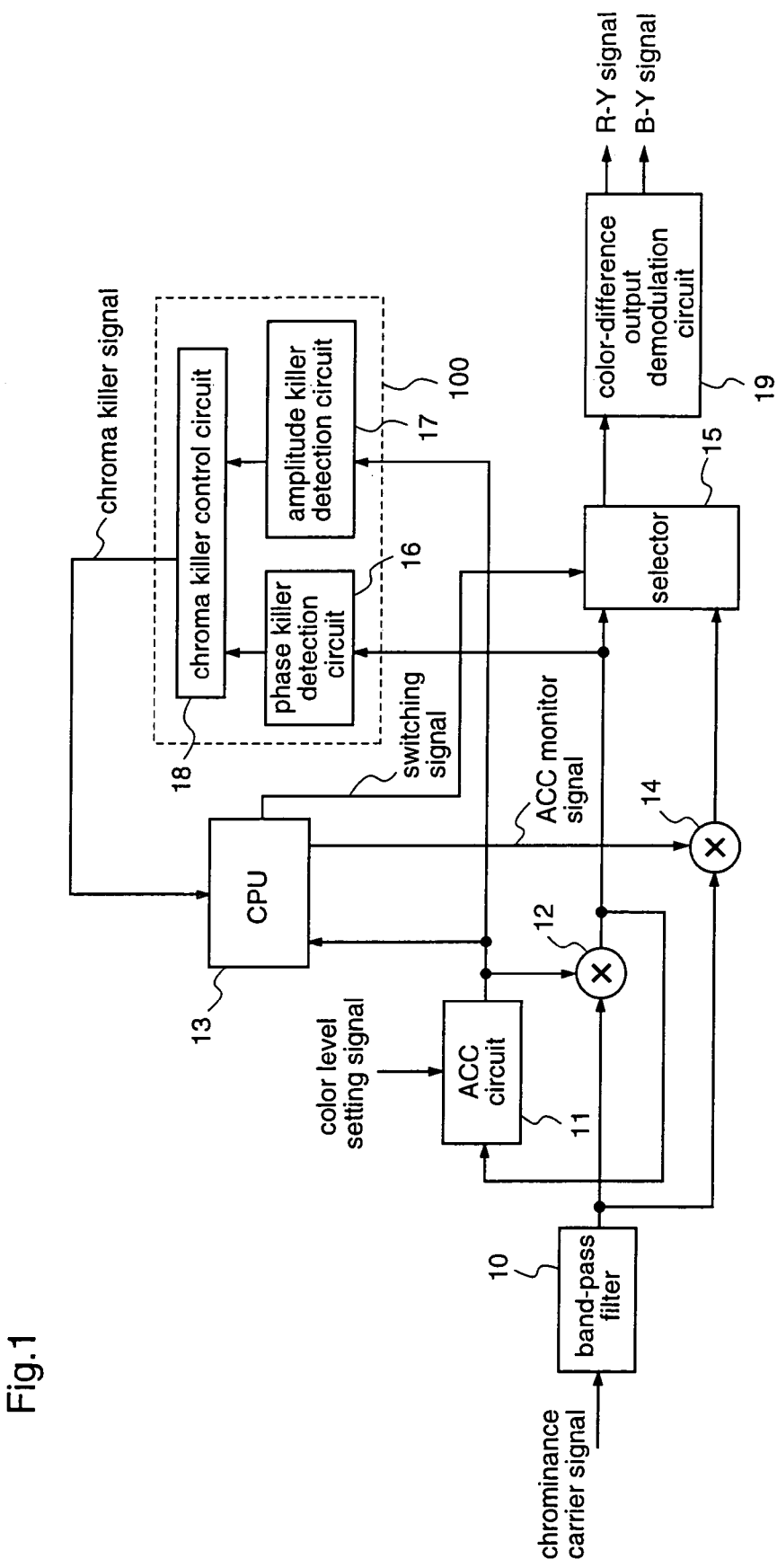
FIG. 1 is a diagram illustrating a structure of a color demodulation circuit according to a first embodiment of the present invention.

FIG. 1 is a diagram illustrating a structure of a color demodulation circuit according to a first embodiment of the present invention.

The color demodulation circuit shown in FIG. 1 includes a band-pass filter 10, an ACC circuit 11, a first amplifier (multiplier) 12, a control circuit (CPU) 13, a second amplifier (multiplier) 14, a selector 15, a chroma killer generation circuit 100, and a color-difference output demodulation circuit 19.

The band-pass filter 10 extracts color components from a digital chrominance carrier signal.

The ACC circuit 11 detects a signal amplitude of a burst portion in the digital chrominance carrier signal, and performs automatic control so that the detected burst signal amplitude has a level that has been previously set by a level setting signal.

The first multiplier 12 multiplies the output from the band-pass filter 10 by the output from the ACC 11.

The CPU 13 monitors the output from the ACC circuit 11 and a chroma killer signal, and outputs an ACC monitor signal and a switching signal. The ACC monitor signal indicates a multiplier factor that is inputted to the multiplier 14. This factor is decided so as to satisfy a relationship: the color level setting signal=the output from the ACC circuit 11 (the factor of the multiplier 12)×the output from the band-pass filter 10.

The multiplier 14 multiplies the output from the band-pass filter 10 by the ACC monitor signal.

The selector 15 selects the output from the multiplier 12 or the output from the multiplier 14 in accordance with the switching signal that is outputted from the CPU 13.

The chroma killer generation circuit 100 includes a phase killer detection circuit 16, an amplitude killer detection circuit 17, and a chroma killer control circuit 18, and generates and outputs a chroma killer signal. The phase killer detection circuit 16 detects a phase state of the burst portion in the output from the multiplier 12 (amplitude-controlled chrominance carrier signal), and outputs a phase killer detection signal when the burst phase is not kept at a prescribed phase state. The amplitude killer detection circuit 17 detects an amplitude of the burst portion in the amplitude-controlled chrominance carrier signal from the output of the ACC circuit 11, and outputs an amplitude killer detection signal when the burst amplitude does not reach a prescribed level. The chroma killer control circuit 18 judges the state of the burst signal on the basis of the phase killer detection signal and the amplitude killer detection signal, and outputs a chroma killer signal.

The color-difference output demodulation circuit 19 demodulates color-difference signals (a R-Y signal and a B-Y signal) from the signal that is selected by the selector 15, on the basis of the chroma killer signal that is generated by the chroma killer generation circuit 100.

Next, the operation of the color demodulation circuit according to the first embodiment will be described.

From a chrominance carrier signal that is inputted to the color demodulation circuit, color components are extracted by the band-pass filter 10. The extracted color components are amplitude controlled by the ACC circuit 11 and the multiplier 12. The amplitude-controlled signal (output from the multiplier 12) is inputted to the phase killer detection circuit 16 and the selector 15. Further, the output from the ACC circuit 11 is inputted to the amplitude killer detection circuit 17.

The phase killer detection circuit 16 performs phase killer detection with respect to the output from the multiplier 12 (amplitude-controlled chrominance carrier signal), and the amplitude killer detection circuit 17 performs amplitude killer detection on the basis of the output from the ACC circuit 11. Then, the chroma killer control circuit 18 generates a chroma killer signal on the basis of the results of the phase killer detection and the amplitude killer detection.

The CPU 13 outputs a switching signal to the selector 15 for selecting the output from the multiplier 12 when the chroma killer signal that is outputted from the chroma killer control circuit 18 is OFF. When the chroma killer signal that is outputted from the chroma killer control circuit 18 is ON, the CPU 13 outputs an output from the ACC circuit 11 immediately before the chroma killer signal is turned ON, to the multiplier 14 as the ACC monitor signal, and outputs a switching signal for selecting the output of the multiplier 14 to the selector 15.

The color-difference output demodulation circuit 19 demodulates color-difference signals (a R-Y signal and a B-Y signal) from the output of the selector 15, and outputs the demodulated signals.

Figure 2:
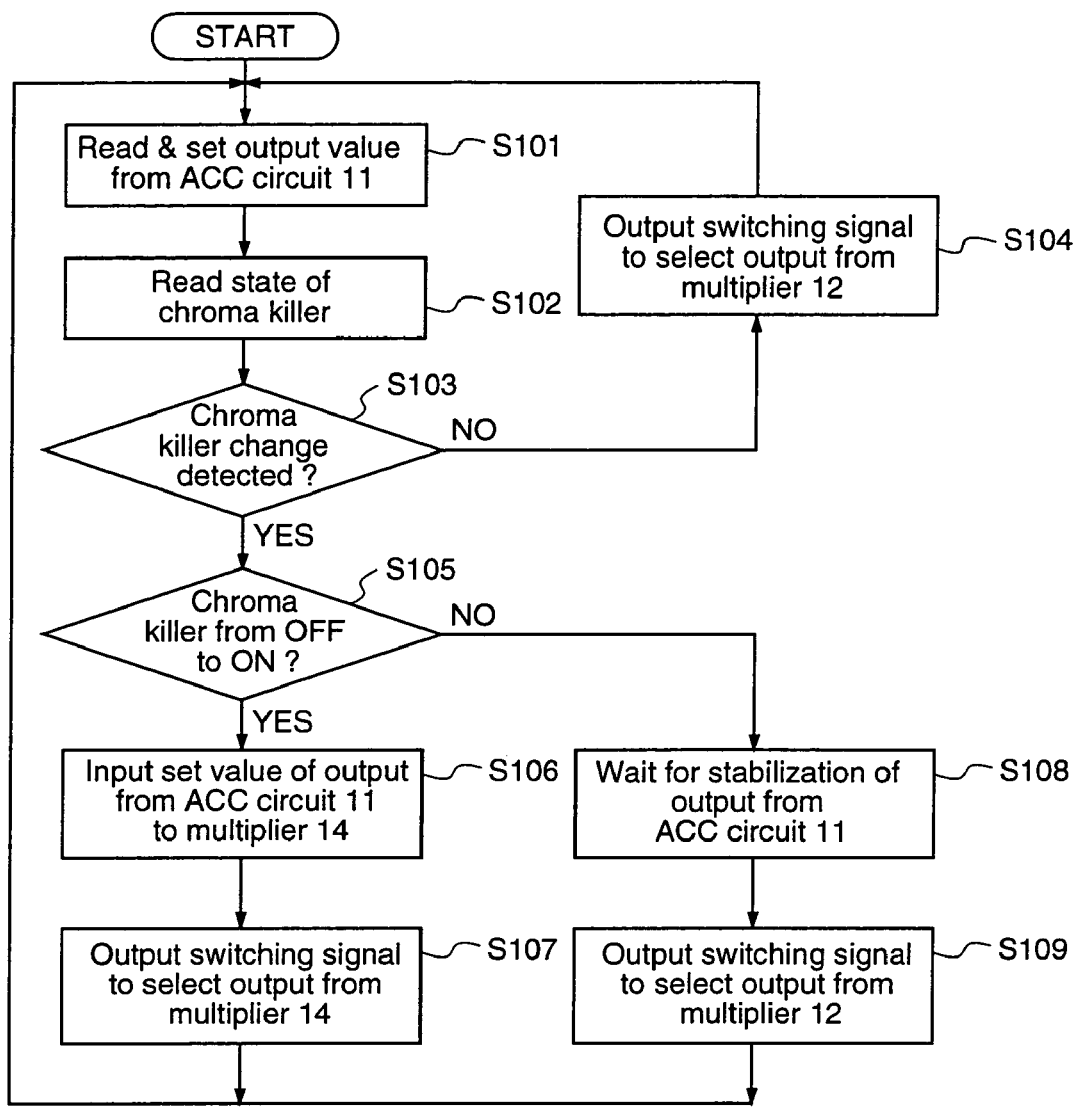
FIG. 2 is a flowchart for explaining an operation of a CPU in the color demodulation circuit according to the first embodiment.
Figure 3:
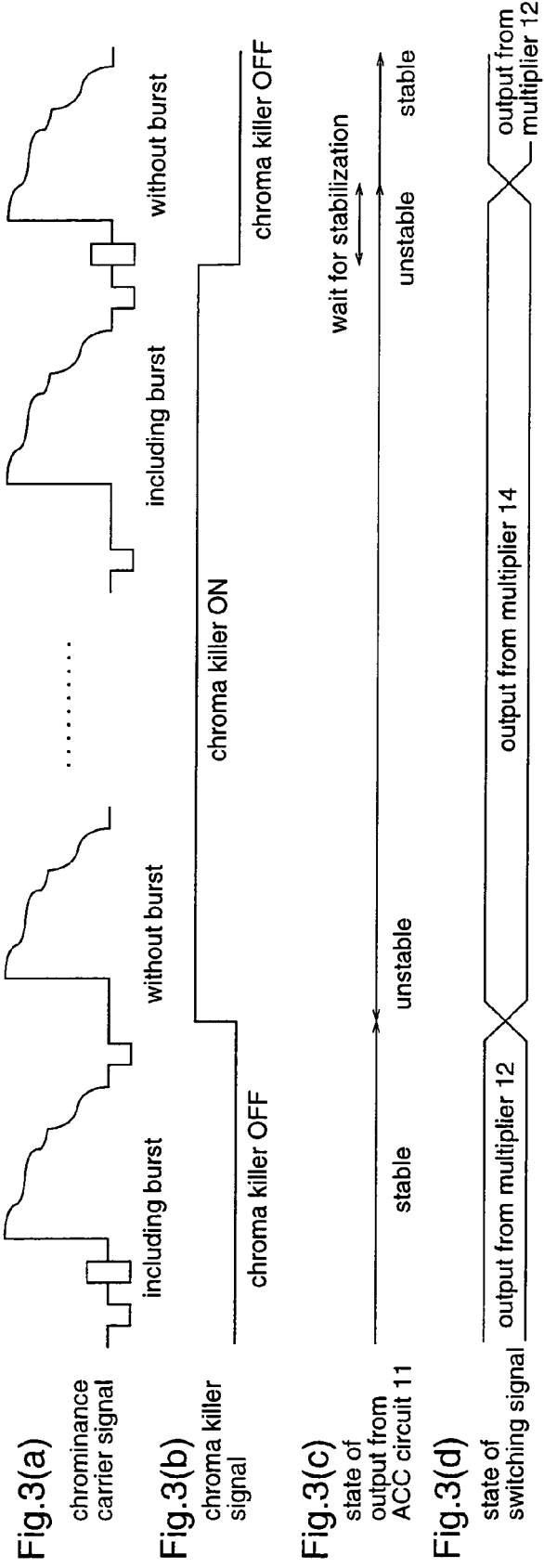
FIGS. 3(a) to 3(d) are diagrams for explaining chroma killer control by the color demodulation circuit according to the first embodiment.

Next, the operation of the CPU 13 in the color demodulation circuit according to the first embodiment will be described with reference to FIGS. 2 and 3. FIG. 2 is a flowchart for explaining the operation of the CPU 13. FIGS. 3 are signal waveform diagrams of the color demodulation circuit according to the first embodiment. FIG. 3(*a*) shows a chrominance carrier signal, FIG. 3(*b*) shows a chroma killer signal, FIG. 3(*c*) shows states of an output from the ACC circuit 11, and FIG. 3(*d*) shows states of the switching signal.

Initially, the value of the output from the ACC circuit 11 is read and set (step S101). Further, a chroma killer signal is read from the chroma killer generation circuit 100 (step S102), and then the chroma killer signal is monitored (step S103).

In step S103, when the chroma killer signal remains OFF and no state change is detected, i.e., when a normal chrominance carrier signal is inputted to the color demodulation circuit, the output from the ACC circuit 11 is stable, and thus a switching signal is outputted so as to select an output from the multiplier 12 (step S104).

On the other hand, when the change of the state of the chroma killer signal is detected in step S103, i.e., when a chrominance carrier signal in which the presence and absence of the burst signal temporally switch as shown in FIG. 3(*a*) is inputted to the color demodulation circuit, it is checked whether the change of the chroma killer signal is from OFF to ON, or from ON to OFF (step S105).

When the change of the chroma killer signal from OFF to ON is detected in step S105, i.e., when the state of the burst portion in the chrominance carrier signal has changed from the presence to the absence, the value that was set in step S101 is outputted to the multiplier 14 as a multiplier factor (ACC monitor signal) (step S106), and a switching signal is outputted to the selector 15 so as to select the output from the multiplier 14 (step S107).

When the change of the chroma killer signal from ON to OFF is detected in step S105, i.e., when the state of the burst portion in the chrominance carrier signal has changed from the absence to the presence, it takes time to stabilize the state of the output from the ACC circuit 11 because of the abrupt change of the burst signal. Therefore, after a prescribed time that is required to stabilize the state of the output from the ACC circuit 11 from when the chroma killer signal has changed from ON to OFF (step S108), a switching signal is outputted to the selector 15 for selecting the output of the multiplier 12 (step S109).

In this first embodiment, the multiplier 14 that is not dependent on the output of the ACC circuit 11 is further provided, the output of the band-pass filter 10 and the ACC monitor signal are connected to the input of the multiplier 14, and the multipliers 12 and 14 are switched according to the state of the output from the ACC circuit 11. Therefore, for example when the state of the output from the ACC circuit 11 is not stable with respect to the temporal change of the inputted chrominance carrier signal between a state including a burst signal and a state without a burst signal, the output of the multiplier 14 that is not dependent on the output from the ACC circuit 11 is inputted to the color-difference output demodulation circuit 19 to demodulate color-difference signals. Accordingly, it is possible to supply a chrominance carrier signal of a prescribed amplitude to the color-difference output demodulation circuit 19 with stability, independently of the state of the output from the ACC circuit 11, thereby enabling to obtain stable outputs as a R-Y signal and a B-Y signal, as well as to prevent transient noises on the television screen which occur when the state of the output from the ACC circuit 11 is not stable.

In this first embodiment, when the chroma killer signal that is outputted from the chroma killer control circuit 18 is ON, the selector 15 is switched to select the output from the multiplier 14 to demodulate signals. However, the signal state of chroma killer and the function of the color-difference demodulation circuit 19 can be modified according to the user's utilization method. For example, when the chroma killer signal is ON, it is also possible to stop outputting a R-Y signal and a B-Y signal, as in the prior art.

Embodiment 2

Figure 4:
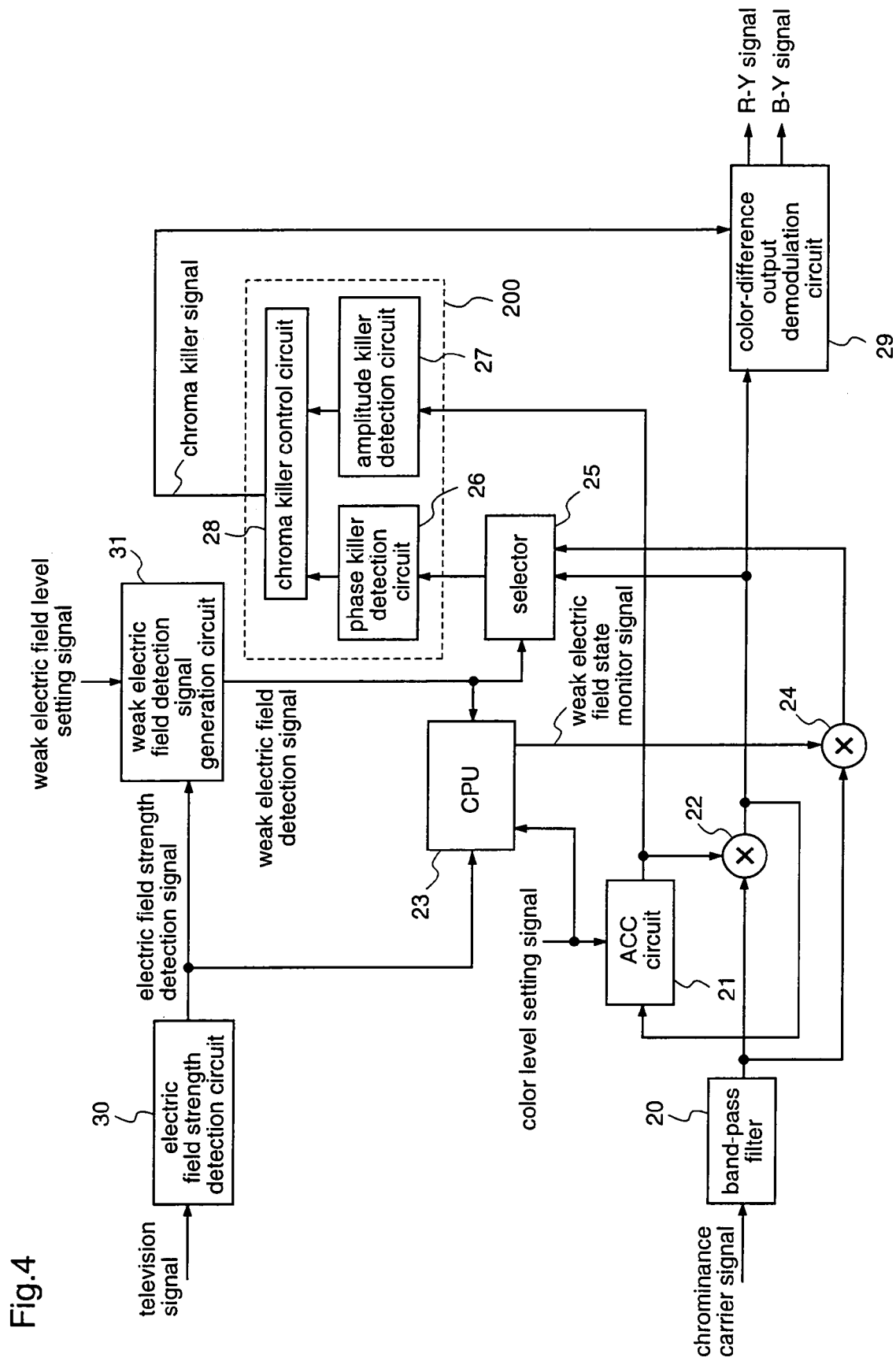
FIG. 4 is a diagram illustrating a structure of a color demodulation circuit according to a second embodiment of the present invention.

FIG. 4 is a diagram illustrating a schematic structure of a color demodulation circuit according to a second embodiment of the present invention.

The color demodulation circuit shown in FIG. 4 includes a band-pass filter 20, an ACC circuit 21, a first amplifier (multiplier) 22, an electric field strength detection circuit 30, a weak electric field detection signal generation circuit 31, a control circuit (CPU) 23, a second amplifier (multiplier) 24, a selector 25, a chroma killer generation circuit 200, and a color-difference output demodulation circuit 29.

The band-pass filter 20 extracts color components of a digital chrominance carrier signal.

The ACC circuit 21 detects a signal amplitude of a burst portion in the digital chrominance carrier signal, and performs automatic control so that the detected burst signal amplitude has a level that is previously set by a color level setting signal.

The multiplier 22 multiplies an output from the band-pass filter 20 by an output from the ACC circuit 21.

The electric field strength detection circuit 30 detects an electric field strength of a television signal.

The weak electric field detection signal generation circuit 31 turns a weak electric field detection signal ON and outputs the same when an electric field strength detection signal that is outputted from the electric field strength detection circuit 30 does not reach a level that is previously set by a weak electric field level setting signal.

The CPU 23 monitors the color level setting signal, the electric field strength detection signal, and the weak electric field detection signal, and outputs a weak electric field state monitor signal. The weak electric field state monitor signal indicates a multiplier factor that is inputted to the multiplier 24. This factor is decided so as to satisfy a relationship: the color level setting signal=the weak electric field state monitor signal (the factor of the multiplier 24)×the output from the band-pass filter 20.

The multiplier 24 multiplies the output from the band-pass filter 20 by the weak electric field state monitor signal.

The selector 25 selects the output from the multiplier 22 or the output from the multiplier 24 in accordance with the weak electric field detection signal.

The chroma killer generation circuit 200 includes a phase killer detection circuit 26, an amplitude killer detection circuit 27, and a chroma killer control circuit 28, and generates and outputs a chroma killer signal. The phase killer detection circuit 26 detects the phase state of a burst portion in the chrominance carrier signal that has been amplitude controlled by the multiplier 22 or the chrominance carrier signal that has been amplitude controlled by the multiplier 24, and outputs a phase killer detection signal when the burst phase does is not kept at a prescribed phase state. The amplitude killer detection circuit 27 detects an amplitude of the burst portion in the amplitude controlled chrominance carrier signal from the output of the ACC circuit 21, and outputs an amplitude killer detection signal when the burst amplitude does not reach a prescribed level. The chroma killer control circuit 28 judges the burst signal state on the basis of the phase killer detection signal and the amplitude killer detection signal, and outputs a chroma killer signal.

The color-difference output demodulation circuit 29 demodulates color-difference signals (a R-Y signal and a B-Y signal) from the output from the multiplier 22 on the basis of the chroma killer signal that is generated by the chroma killer generation circuit 200.

Next, the operation of the color demodulation circuit according to the second embodiment will be described.

From a chrominance carrier signal that is inputted to the color demodulation circuit, color components are extracted by the band-pass filter 20. The extracted components are amplitude controlled by the ACC circuit 21 and the multiplier 22. The amplitude controlled signal (an output from the multiplier 22) is inputted to the selector 25 and the color-difference output demodulation circuit 29. Further, the output from the ACC circuit 21 is inputted to the amplitude killer detection circuit 27.

The CPU 23 monitors a color level setting signal and a weak electric field detection signal that is outputted from the weak electric field detection signal generation circuit 31, and outputs a weak electric field state monitor signal to the multiplier 24 on the basis of the color level setting signal and an electric field strength detection signal that is outputted from the electric field strength detection circuit 30 when the weak electric field detection signal is ON.

When the weak electric field detection signal that is outputted from the weak electric field detection signal generation circuit 31 is OFF, the selector 25 selects an output from the multiplier 22, while when the weak electric field detection signal is ON, the selector 25 selects an output from the multiplier 24, and then the selected output is inputted to the phase killer detection circuit 26.

The phase killer detection circuit 26 performs phase killer detection for the output from the selector 25, and the amplitude killer detection circuit 27 performs amplitude killer detection for the output from the ACC circuit 21. The chroma killer control circuit 28 generates a chroma killer signal on the basis of results of the phase killer detection and the amplitude killer detection.

The color-difference output demodulation circuit 29 demodulates color-difference signals from the output of the multiplier 22 when the chroma killer signal is OFF, and stops outputting the color-difference signals when the chroma killer signal is ON.

Figure 5:
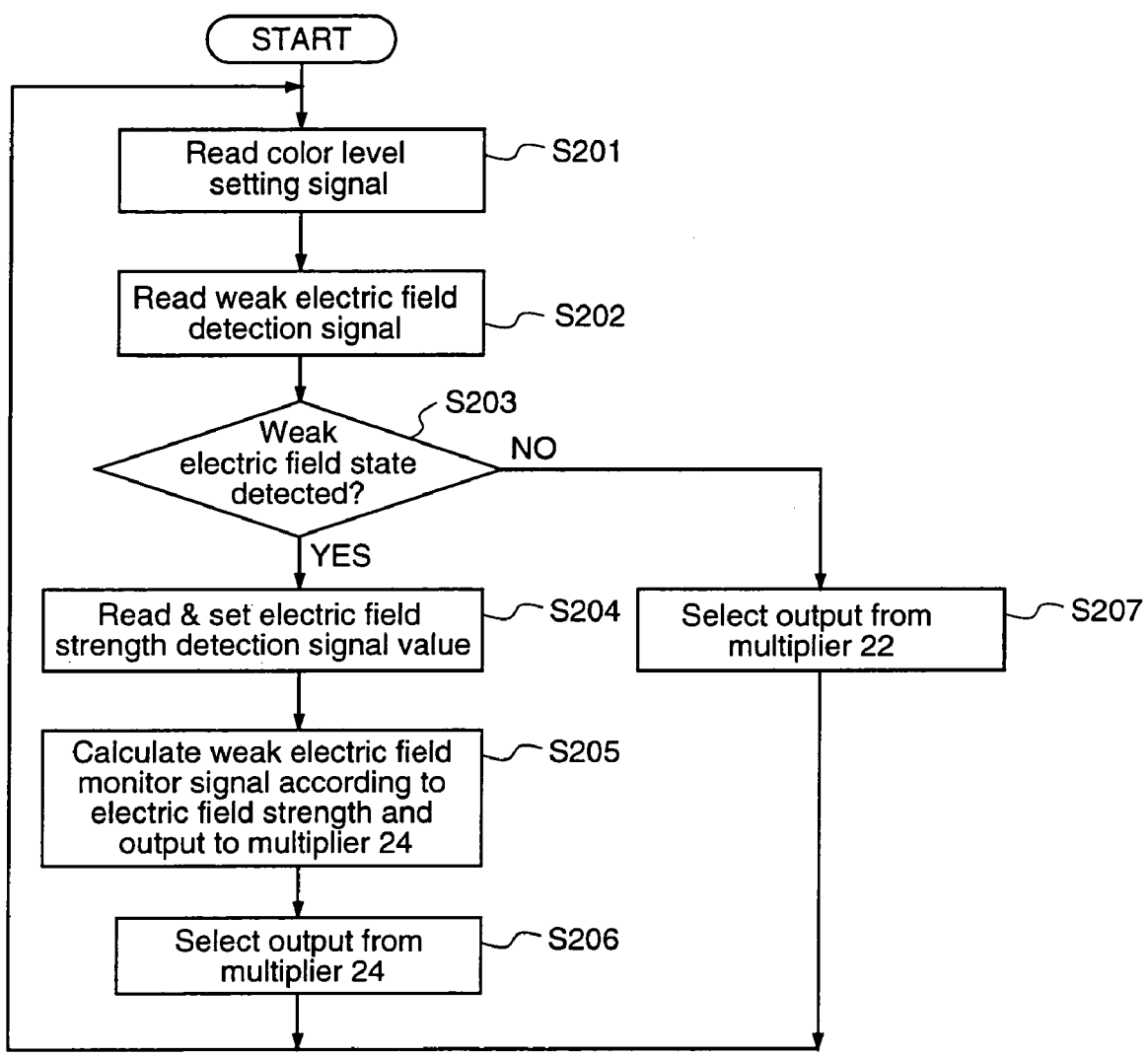
FIG. 5 is a flowchart for explaining an operation of a CUP in the color demodulation circuit according to the second embodiment.
Figure 6:
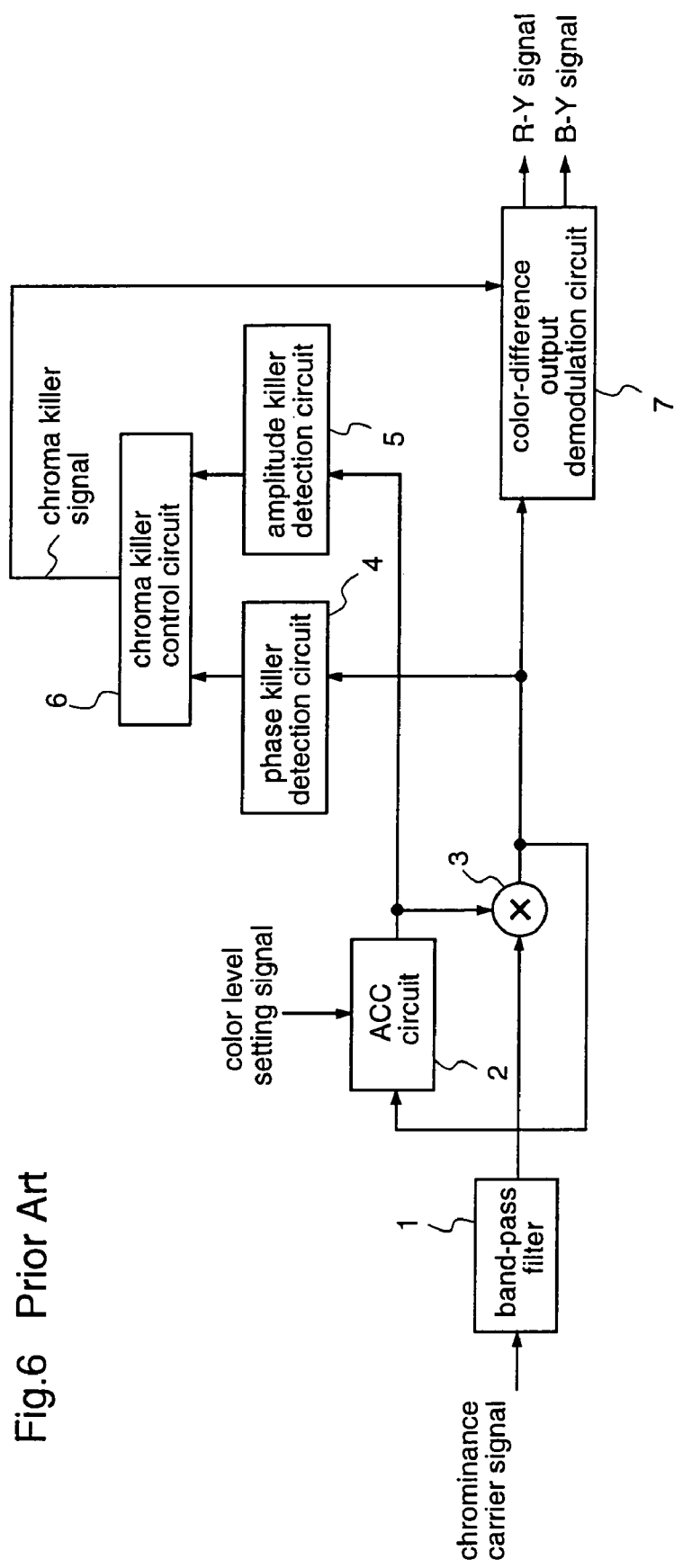
FIG. 6 is a diagram illustrating a structure of a conventional color demodulation circuit.

Next, the operations of the CPU 23 and the selector 25 in the color demodulation circuit according to the second embodiment will be described, with reference to FIG. 5. Here, steps S201 to S205 show the operation of the CPU 23, and steps S206 to S207 show the operation of the selector 25.

Initially, the CPU 23 reads the color level setting signal (step S201). The CPU 23 further reads a weak electric field detection signal from the weak electric field detection signal generation circuit 31 (step S202), and monitors an electric field strength of a television signal (step S203).

In step S203, when it is detected that the television signal is in a weak electric field state (a state in which the electric field is weak), i.e., when the weak electric field detection signal is ON, the CPU 23 reads the electric field strength detection signal from the electric field strength detection circuit 30 to set the same (step S204), and outputs a value that is calculated on the basis of the color level setting signal and the electric field strength detection signal as a weak electric field state monitor signal to the multiplier 24 (step S205). Further, the selector 25 selects the output from the multiplier 24, and inputs the same to the phase killer detection circuit 26 (step S206).

On the other hand, when it is detected in step S023 that the television signal is in a normal electric field state, i.e., when the weak electric field detection signal is OFF, the selector 25 selects the output from the multiplier 22, and inputs the same to the phase killer detection circuit 26 (step S207).

By changing the signal that is outputted to the phase killer detection circuit 26 using the selector 25, it becomes possible to prevent an erroneous detection of phase killer that occurs due to the unstability of the output from the ACC circuit 21 in the weak electric field state.

In this second embodiment, the multiplier 24 that is independent of the output from the ACC circuit 21 is provided, and the input to the phase killer detection circuit 26 is controlled in accordance with the electric field state of the chrominance carrier signal. Therefore, when the state of the output from the ACC circuit 21 is unstable, the output from the multiplier 24 which is independent of the output from the ACC circuit 21 is inputted to the phase killer detection circuit 26, whereby it becomes possible to supply a chrominance carrier signal having a prescribed amplitude to the phase killer detection circuit 26 with stability, regardless of the state of the output from the ACC circuit 21 and, consequently, it is possible to prevent an erroneous detection of phase killer.

In this second embodiment, the descriptions have been given of the case where the color-difference outputs from the color-difference output demodulation circuit 29 are stopped when the chroma killer signal that is outputted from the chroma killer control circuit 28 is ON. However, the signal state of chroma killer and the function of the color-difference output demodulation circuit 29 can be changed according to the user's utilization method. For example, it is also possible that only the chroma killer detection is performed, and color-difference outputs are outputted as they are from the color-difference output demodulation circuit 29.

The color demodulation circuit according to the present invention enables stable color-difference demodulation output and stable killer detection, independently of the burst signal of the inputted chrominance carrier signal, and it is useful as a color demodulation circuit in television signal processing.

What is claimed is:

1. A color demodulation circuit that demodulates color-difference signals from a chrominance carrier signal, including:
    a first amplifier circuit for amplifying an amplitude of the chrominance carrier signal;
    an ACC circuit for variably controlling a degree of amplification of the first amplifier circuit in accordance with the inputted chrominance carrier signal;
    a chroma killer generation circuit for detecting an amplitude level of a burst portion in the chrominance carrier signal from an output of the ACC circuit as well as detecting a phase shift of the burst portion in the chrominance carrier signal from an output of the first amplifier circuit, and generating a chroma killer signal on the basis of detection results;
    a second amplifier circuit for amplifying an amplitude of the chrominance carrier signal;
    a selector for selecting one of an output from the first amplifier circuit and an output from the second amplifier circuit;
    a control circuit for setting a degree of amplification of the second amplifier circuit and switching the selector on the basis of the chroma killer signal; and
    a color-difference output demodulation circuit for demodulating color-difference signals from the output of the selector.

2. The color demodulation circuit as defined in claim 1 wherein
    the control circuit switches the selector, to select an output from the first amplifier circuit when the chroma killer signal is OFF, while selecting an output from the second amplifier circuit when the chroma killer signal is ON.

3. A color demodulation circuit that demodulate color-difference signals from a chrominance carrier signal including:
    a first amplifier circuit for amplifying an amplitude of the chrominance carrier signal;
    an ACC circuit for variably controlling a degree of amplification of the first amplifier circuit in accordance with the inputted chrominance carrier signal;
    a second amplifier circuit for amplifying an amplitude of the chrominance carrier signal;
    a control circuit for setting a degree of amplification of the second amplifier circuit on the basis of an electric field strength of the chrominance carrier signal;
    a selector for selecting one of an output from the first amplifier circuit and an output from the second amplifier circuit on the basis of the electric field strength of the chrominance carrier signal;
    a chroma killer generation circuit for detecting an amplitude level of a burst portion in the chrominance carrier signal from an output of the ACC circuit as well as detecting a phase shift of the burst portion in the chrominance carrier signal from an output of the selector, and generating a chroma killer signal on the basis of detection results; and a color-difference demodulation circuit for demodulating color-difference signals from the output of the first amplifier circuit.

4. The color demodulation circuit as defined in claim 3 wherein the selector selects an output from the first amplifier circuit when the chrominance carrier signal is higher than a previously set electric field strength, while selecting an output from the second amplifier circuit when the chrominance carrier signal is lower than the previously set electric field strength.

* * * * *